United States Patent Office 2,739,052
Patented Mar. 20, 1956

2,739,052

HERBICIDAL COMPOSITIONS COMPRISING HALOARYLOXY SUBSTITUTED ALIPHATIC ACIDS

Henry L. Morrill, Clayton, Mo., assignor to Monsanto Chemical Company, St. Louis, Mo., a corporation of Delaware No Drawing. Application May 7, 1951,
Serial No. 225,049

21 Claims. (Cl. 71—2.4)

This invention relates to herbicidal compositions comprising haloaryloxy substituted aliphatic acids and particularly to methods for preparing same. The invention also relates to a method of controlling noxious vegetation by the employment of a dust-free composition comprising a haloaryloxy substituted aliphatic acid.

Solid materials, commonly called "carriers," have heretofore been mixed by various methods together with haloaryloxy substituted aliphatic acids possessing herbicidal properties in order to produce dry formulations for the control of noxious vegetation. However, certain disadvantages still remain. One disadvantage is that the haloaryloxy aliphatic acids are usually incorporated either in the solid "carrier" followed by a tumbling operation or as a part of a grinding operation in a pebble mill for reducing the component parts to the appropriate particle size. These operations are expensive and time consuming and produce a product containing a large amount of fines. Such haloaryloxy aliphatic acid containing formulations are objectionable in that when the dry formulation is applied, for example by a manually or automatically operable duster, these finely divided particles or fines float in the air and via air currents are apt to come in contact with and injure or destroy desirable vegetation. These finely divided particles or fines are objectionable not only in view of the aforesaid but also because they represent a waste of material.

In accordance with this invention it has been found that the above objections are substantially overcome without in any way impairing the value of the materials as herbicides by the fusion of a solid absorbent material with a haloaryloxy substituted aliphatic acid of the formula $$X_n\text{—}R\text{—}O\text{—}R'COOH$$

where X is a halogen atom, where $n$ is a whole number, where R is an aryl radical, and where R'—COOH is an aliphatic acid residue. The fused product is a highly effective substantially dustless herbicidal composition which embodies an optimum distribution of the haloaryloxy aliphatic acid throughout the resultant composition. In this fused form the composition has a far greater herbicidal effect over a longer period of time than other forms of herbicidal compositions containing a haloaryloxy aliphatic acid. The herbicidal composition of this invention not only exhibits much better lasting properties but withstands a far greater amount of rainfall than do other forms of compositions containing a haloaryloxy aliphatic acid. In view of the long lasting properties and resistance to washing off via rainfall the herbicidal compositions of this invention afford the application of larger amounts of herbicide per unit area, thus reducing the number of applications per unit time. Furthermore the fused products are characterized by good storage properties in that they exhibit no tendency to cake or to produce fines by the rubbing of the fused particles against one another.

The solid absorbent materials employed in the formation of the herbicidal compositions of this invention may be herbicidally active or inert. Exemplary of such are fuller's earth, kieselguhr, diatomaceous earth, talc, chalk, wood flour, nutshell flours, charcoal, inorganic phosphates, magnesium carbonate and like solid materials which are absorbents for the haloaryloxy aliphatic acids of this invention. In carrying out the process of this invention the solid carriers should have a particle size of less than about 50 microns and preferably less than about 15 microns. It is to be emphasized that the carrier is not just coated but that the haloaryloxy aliphatic acid is absorbed in the porous carrier.

Examples of the haloaryloxy substituted aliphatic acids of this invention are o-chlorophenoxyacetic acid; 2,4-dichlorophenoxyacetic acid; 2,4,5-trichlorophenoxyacetic acid; 2,4,6-trichlorophenoxyacetic acid; 2,3,4,6-tetrachlorophenoxyacetic acid; pentachlorophenoxyacetic acid; p-bromophenoxyacetic acid; 2,4-dibromophenoxyacetic acid; 2,4,6-tribromophenoxyacetic acid; p-iodophenoxyacetic acid; p-fluorophenoxyacetic acid; 2,4-difluorophenoxyacetic acid; 4-chloro-o-toloxyacetic acid; 4-chloro-m-toloxyacetic acid; 4-chloro-2-ethylphenoxyacetic acid; 4-chloro-3,5-dimethylphenoxyacetic acid; 2-chloro-1-naphthoxyacetic acid; 2,4-dichloro-1-naphthoxyacetic acid; α[2-chloro-1-naphthoxy]-propionic acid and the corresponding haloaryloxy derivatives of higher aliphatic acids and the corresponding haloaryloxy derivatives of such unsaturated aliphatic acids as acrylic acid and its homologues.

In carrying out the process of this invention either crude or pure haloaryloxy substituted aliphatic acid can be employed and it is preferred that the crude or pure acid be added in the form of a melt to a solid absorbent carrier which is being agitated in a suitable mixing apparatus, the temperature of the carrier during the addition of the melt being above the fusion temperature of the crude or pure acid but below the decomposition temperature of the particular acid. However, in the broader aspects of this invention it is to be understood that variations of the aforesaid can be employed. For example, the crude or pure acid and solid absorbent carrier may be first mechanically mixed and then heated to a temperature above the fusion temperature of the crude or pure acid, or the acid may be added in solid form to the solid absorbent carrier, the latter being heated sufficiently during the addition such that the temperature of the mix does not fall below the fusion temperature of the crude or pure acid.

As an example of the preferred embodiment of this invention the following is illustrative:

Example I 200 parts by weight of fuller's earth (1–20 microns) is charged into a suitable vessel and heated to above 150° C. Thereupon, while rotating the vessel and maintaining the temperature at about 145°–155° C., there is added 22.2 parts by weight of molten 2,4-dichlorophenoxyacetic acid (M. P. 138° C.) Upon completion of the acid addition the vessel is rotated for a few minutes while maintaining the temperature at about 145°–155° C. and then cooled. The resultant product is substantially dustless and composed of discrete particles containing 10% by weight of 2,4-dichlorophenoxyacetic acid dispersed therein.

Upon evaluating the herbicidal composition of Example I against a herbicidal composition containing the same rato of active ingredient to carrier but mixed mechanically by conventional methods, by the application of each, respectively, to an area infested with noxious vegetation at the same ratio of active ingredient per unit area it is found that the former composition withstands one and one-half to two times as much rainfall as the latter and is one and one-half to two times as effective in length of time of controlling the growth of noxious vegetation.

As further examples of the preferred embodiment of this invention, the following is illustrative:

*Example II*

100 parts by weight of talc (1–7 microns) is charged into a suitable vessel and heated to about 120° C. Thereupon, while rotating the vessel and maintaining the temperature at about 115°–125° C., there is added 11.1 parts by weight of molten 4-chloro-o-toloxyacetic acid (M. P. 118° C.). Upon completion of the acid addition the vessel is rotated for a few minutes while maintaining the temperature at about 115°–125° C. and then cooled. The product so formed is substantially dustless and composed of discrete particles containing 10% by weight of 4-chloro-o-toloxyacetic acid dispersed therein.

Employing a technical grade of 4-chloro-o-toloxyacetic acid having a melting point of 97–105° C., the operating temperature is reduced from 115°–125° C. to 95–110° C. The substantially dustless product resulting thereby is not unlike that obtained by the usage of pure 4-chloro-o-toloxyacetic acid.

*Example III*

500 parts by weight of celite (1–20 microns) is charged into a suitable vessel and heated to about 165° C. Thereupon, while rotating the vessel and maintaining the temperature at about 160–170° C., there is added 22.2 parts by weight of molten 2,4,5-trichlorophenoxyacetic acid (M. P. 160° C.). Upon completion of the acid addition the vessel is rotated for a few minutes while maintaining the temperature at about 160–170° C. and then cooled. The product so formed is substantially dustless and composed of discrete particles containing 4.25% by weight of 2,4,5-trichlorophenoxyacetic acid dispersed therein.

Upon evaluating the respective compositions of Examples II and III against anhydrous herbicidal compositions containing, respectively, the same ratio of ingredients mechanically mixed by conventional methods there is obtained in each instance substantially the same relative results as in Example I.

In another aspect the process of this invention embodies the inclusion of small amounts of additives, e. g. 1–10% by weight based upon the acid of additives such as dimethylamine, triethylamine, diethanolamine, triethanolamine, isopropylamine, isopropanolamine, glycerol, glycols, sodium or potassium ethyl phosphates, polyvinyl alcohol, gelatin, methyl cellulose, sodium carboxymethyl cellulose and the like. Such additives may be incorporated directly or in the form of aqueous solutions either before or after the fusion operation. While such additives are not necessary in the preparation of the herbicidal compositions of this invention their admixture with the acid prior to the fusion operation results in a lowering of the fusing temperature below that of the melting point of the crude or pure acid. As an example of this embodiment the following is illustrative:

*Example IV*

496 parts by weight of fuller's earth (10–40 microns) is charged into a suitable vessel and heated to about 115° C. Thereupon while rotating the vessel and maintaining the temperature at about 115° C., a melt of a herbicidal mixture containing 55.5 parts by weight of 2,4-dichlorophenoxyacetic acid, 4.2 parts by weight of triethanolamine, and 10 parts by weight of water is incorporated therein. Upon completion of said addition the vessel is rotated for 5–10 minutes at 110–120° C. to remove all of the water and subsequently cooled. The resultant product is substantially dustless and composed of discrete particles containing 10% by weight of 2,4-dichlorophenoxyacetic acid dispersed therein.

As another example of the process of this invention in its broader aspects the following is illustrative:

*Example V*

494 parts by weight of diatomaceous earth (10–40 microns) and 55.5 parts by weight of 2,4-dichlorophenoxyacetic acid is charged into a suitable vessel and while rotating the mix is heated to 150° C. for 5–10 minutes. The melt is cooled to about 110° C. and thereto is added and intimately mixed 55 parts by weight of a 10% by weight aqueous solution of gelatin. The mix is then held at 110–120% to remove the water. The resultant product obtained upon cooling the mix is substantially dustless and composed of discrete particles containing 10% by weight of 2,4-dichlorophenoxyacetic acid dispersed therein.

The haloaryloxy substituted aliphatic acids of this invention can be admixed with the absorbent carrier in any suitable herbicidal quantity as for example amounts up to about one part acid for each part of carrier. In that the process of this invention is particularly concerned with the manufacture of concentrated herbicidal compositions the quantity of active ingredient will ordinarily be maintained at the maximum consistent with the absorptivity of the carrier.

While this invention has been described relative to certain specific embodiments it is not so limited but that modifications thereof and variations may be made without departing from the spirit or scope of the invention.

What is claimed is:

1. The method of preparing a free-flowing discrete particulate substantially dust-free herbicidal composition which consists in mixing a herbicidal mixture comprising a haloaryloxy substituted aliphatic acid with a finely divided solid absorbent carrier therefor wherein the weight of the haloaryloxy substituted aliphatic acid does not exceed the weight of the solid absorbent carrier, subjecting the mixture while agitating to a temperature above the fusion temperature of the said acid, and cooling the resultant mixture whereby the free-flowing discrete particulate substantially dust-free herbicidal composition is obtained.

2. The method of preparing a free-flowing discrete particulate substantially dust-free herbicidal composition which consists in adding a haloaryloxy substituted aliphatic acid to a finely divided solid absorbent carrier therefor while maintaining the temperature of the carrier above the fusion temperature of the acid, the weight of the said acid being not greater than the weight of the solid absorbent carrier, agitating the resulting mixture at a temperature above the fusion temperature of the said acid, and cooling the resultant mixture whereby the free-flowing discrete particulate substantially dust-free herbicidal composition is obtained.

3. The method of preparing a free-flowing discrete particulate substantially dust-free herbicidal composition which consists in adding a haloaryloxy substituted acetic acid in the form of a melt to a finely divided solid absorbent carrier therefor while maintaining the temperature of the carrier above the fusion temperature of the acid, the weight of the said acid being not greater than the weight of the solid absorbent carrier, agitating the resulting mixture at a temperature above the fusion temperature of the said acid, and cooling the resultant mixture whereby the free-flowing discrete particulate substantially dust-free herbicidal composition is obtained.

4. The method of preparing a free-flowing discrete particulate substantially dust-free herbicidal composition which consists in adding a halophenoxy substituted acetic acid in the form of a melt to a finely divided solid absorbent carrier therefor while maintaining the temperature of the carrier above the fusion temperature of the acid, the weight of the said acid being not greater than the weight of the solid absorbent carrier, agitating the resulting mixture at a temperature above the fusion temperature of the said acid, cooling the resultant mixture whereby the free-flowing discrete particulate substantially dust-free herbicidal composition is obtained.

5. The method of preparing a free-flowing discrete particulate substantially dust-free herbicidal composition which consists in adding a chlorophenoxy substituted acetic acid in the form of a melt to a finely divided solid absorbent carrier therefor while maintaining the temperature of the carrier above the fusion temperature of the acid, the weight of the said acid being not greater than the weight of the said solid absorbent carrier, agitating the resulting mixture at a temperature above the fusion temperature of the said acid, and cooling the resultant mixture whereby the free-flowing discrete particulate substantially dust-free herbicidal composition is obtained.

6. The method of preparing a free-flowing discrete particulate substantially dust-free herbicidal composition which consists in adding a chlorophenoxy substituted acetic acid in the form of a melt to fuller's earth while maintaining the temperature of the fuller's earth above the fusion temperature of the acid, the weight of the said acid being not greater than the weight of the said fuller's earth, agitating the resulting mixture at a temperature above the fusion temperature of the said acid, and cooling the resultant mixture whereby the free-flowing discrete particulate substantially dust-free herbicidal composition is obtained.

7. The method of preparing a free-flowing discrete particulate substantially dust-free herbicidal composition which consists in adding 2,4-dichlorophenoxy acetic acid in the form of a melt to fuller's earth while maintaining the temperature of the fuller's earth above the fusion temperature of the acid, the weight of the said acid being not greater than the weight of the said fuller's earth, agitating the resulting mixture at a temperature above the fusion temperature of the said acid, and cooling the resultant mixture whereby the free-flowing discrete particulate substantially dust-free herbicidal composition is obtained.

8. The method of preparing a free-flowing discrete particulate substantially dust-free herbicidal composition which consists in adding 2,4,5-trichlorophenoxy acetic acid in the form of a melt to fuller's earth while maintaining the temperature of the fuller's earth above the fusion temperature of the acid, the weight of the said acid being not greater than the weight of the said fuller's earth, agitating the resulting mixture at a temperature above the fusion temperature of the said acid, and cooling the resultant mixture whereby the free-flowing discrete particulate substantially dust-free herbicidal composition is obtained.

9. The method of preparing a free-flowing discrete particulate substantially dust-free herbicidal composition which consists in adding 4-chloro-o-toloxy acetic acid in the form of a melt to fuller's earth while maintaining the temperature of the fuller's earth above the fusion temperature of the acid, the weight of the said acid being not greater than the weight of the said fuller's earth, agitating the resulting mixture at a temperature above the fusion temperature of the said acid, and cooling the resultant mixture whereby the free-flowing discrete particulate substantially dust-free herbicidal composition is obtained.

10. A herbicidal composition prepared according to the process of claim 1.

11. A herbicidal composition prepared according to the process of claim 2.

12. A herbicidal composition prepared according to the process of claim 6.

13. A herbicidal composition prepared according to the process of claim 7.

14. A herbicidal composition prepared according to the process of claim 8.

15. A herbicidal composition prepared according to the process of claim 9.

16. A process of controlling noxious vegetation which comprises treating noxious vegetation over a prolonged period of time with a herbicidal quantity of the composition of claim 10.

17. A process of controlling noxious vegetation which comprises treating noxious vegetation over a prolonged period of time with a herbicidal quantity of the composition of claim 11.

18. A process of controlling noxious vegetation which comprises treating noxious vegetation over a prolonged period of time with a herbicidal quantity of the composition of claim 12.

19. A process of controlling noxious vegetation which comprises treating noxious vegetation over a prolonged period of time with a herbicidal quantity of the composition of claim 13.

20. A process of controlling noxious vegetation which comprises treating noxious vegetation over a prolonged period of time with a herbicidal quantity of the composition of claim 14.

21. A process of controlling noxious vegetation which comprises treating noxious vegetation over a prolonged period of time with a herbicidal quantity of the composition of claim 15.

References Cited in the file of this patent

UNITED STATES PATENTS

| | | |
|---|---|---|
| 2,278,443 | Heath | Apr. 7, 1942 |
| 2,322,761 | Lontz | June 29, 1943 |
| 2,390,941 | Jones | Dec. 11, 1945 |
| 2,423,457 | Lynn | July 8, 1947 |
| 2,523,228 | Mullison | Sept. 19, 1950 |
| 2,529,681 | Flenner | Nov. 14, 1950 |
| 2,529,682 | Flenner | Nov. 14, 1950 |

FOREIGN PATENTS

| | | |
|---|---|---|
| 366,705 | Italy | Jan. 5, 1939 |